United States Patent
Wada et al.

(10) Patent No.: US 8,095,637 B2
(45) Date of Patent: Jan. 10, 2012

(54) COMMUNICATION SYSTEM AND COMMUNICATION DEVICE

(75) Inventors: Yuuki Wada, Yokohama (JP); Noriyuki Kurosawa, Yokohama (JP)

(73) Assignee: Kyocera Corporation, Kyoto (JP)

( * ) Notice: Subject to any disclaimer, the term of this patent is extended or adjusted under 35 U.S.C. 154(b) by 207 days.

(21) Appl. No.: 12/280,952

(22) PCT Filed: Feb. 27, 2007

(86) PCT No.: PCT/JP2007/053606
§ 371 (c)(1),
(2), (4) Date: Feb. 23, 2009

(87) PCT Pub. No.: WO2007/099938
PCT Pub. Date: Sep. 7, 2007

(65) Prior Publication Data
US 2009/0150543 A1    Jun. 11, 2009

(30) Foreign Application Priority Data

Feb. 27, 2006  (JP) .................................. 2006-050008
Jan. 26, 2007  (JP) .................................. 2007-016859

(51) Int. Cl.
*G06F 15/16* (2006.01)
(52) U.S. Cl. ...................................... 709/223; 455/410
(58) Field of Classification Search .......... 709/223–225, 709/234; 455/410, 422, 418, 419
See application file for complete search history.

(56) References Cited

U.S. PATENT DOCUMENTS

| | | | |
|---|---|---|---|
| 7,231,202 B2 * | 6/2007 | Natsuno | 455/410 |
| 7,783,281 B1 * | 8/2010 | Cook et al. | 455/410 |
| 7,809,352 B2 * | 10/2010 | Jiang | 455/410 |
| 2004/0204021 A1 * | 10/2004 | Cocita | 455/550.1 |
| 2004/0224665 A1 * | 11/2004 | Kokubo | 455/411 |
| 2008/0233919 A1 * | 9/2008 | Kenney | 455/411 |

FOREIGN PATENT DOCUMENTS

| | | | |
|---|---|---|---|
| JP | 2000151798 A | 5/2000 |
| JP | 2002077433 A | 3/2002 |
| JP | 2002252875 A | 9/2002 |
| JP | 2003224886 A | 8/2003 |
| JP | 2005020108 A | 1/2005 |
| JP | 2005122576 A | 5/2005 |

OTHER PUBLICATIONS

International Search Report for corresponding PCT application PCT/JP2007/053606 lists the references above.
Chinese language office action (rejection decision) dated Apr. 26, 2011 and its English language translation for corresponding Chinese application 200780014841.6.

* cited by examiner

*Primary Examiner* — Zarni Maung
(74) *Attorney, Agent, or Firm* — DLA Piper LLP (US)

(57) ABSTRACT

A communication system includes a communication device and a communication network configured to communicate with the communication device. The communication network includes a storage unit configured to store first communication information related to a communication to the communication device that is generated when communications with the communication device are unattainable; and a notifying unit configured to send the first communication information stored in the storage unit to the communication device when communications with the communication device become attainable. The communication device is configured to receive the first communication information sent from the notifying unit, and includes a restraining unit configured to restrain function of a local device based on the first communication information.

14 Claims, 17 Drawing Sheets

DATA STRUCTURE OF MEMORY

| REMOTE LOCK | ON |
|---|---|
| SPECIFIC TELEPHONE NUMBER | 03-AAAA-BBBB |
| RECEIVING-CALL GENERATION TIMES | 3 TIMES |
| RECEIVING-CALL GENERATION PERIOD RANGE | 10 MINUTES |

FIG. 9

DATA FORMAT OF ALARM INFORMATION

INTENSITY OF RADIO WAVE/ /.....etc (NOTIFICATION AREA)

(NOTIFICATION 1)
DATE AND TIME:2005/12/12 20:28
CALL SOURCE:03-AAAA-BBBB (NOTIFICATION 2)
DATE AND TIME:2005/12/12 20:32
CALL SOURCE:03-AAAA-BBBB

DATA STRUCTURE OF MEMORY

| | |
|---|---|
| REMOTE DATA DELETION | ON |
| SPECIFIC TELEPHONE NUMBER | 03-AAAA-BBBB |
| RECEIVING-CALL GENERATION TIMES | 3 TIMES |
| RECEIVING-CALL GENERATION PERIOD RANGE | 10 MINUTES |

FIG. 12

SETTING DATA STRUCTURE OF DATA MEMORY

| DELETION TARGET FLAG | DATA FILE NAME |
|---|---|
| 0 | ADDRESS BOOK |
| 1 | RECEIVED MAIL |
| ⋮ | ⋮ |

DATA STRUCTURE OF MEMORY

| REMOTE LOCK | ON |
|---|---|
| REMOTE DATA DELETION | ON |
| SPECIFIC TELEPHONE NUMBER | 03-AAAA-BBBB |
| RECEIVING-CALL GENERATION TIMES | 3 TIMES |
| RECEIVING-CALL GENERATION PERIOD RANGE | 10 MINUTES |

DATA STRUCTURE OF MEMORY

| REMOTE DATA TRANSFER | ON |
|---|---|
| SPECIFIC TELEPHONE NUMBER | 03-AAAA-BBBB |
| RECEIVING-CALL GENERATION TIMES | 3 TIMES |
| RECEIVING-CALL GENERATION PERIOD RANGE | 10 MINUTES |

SETTING DATA STRUCTURE OF DATA MEMORY

| TRANSFER TARGET FLAG | DATA FILE NAME |
|---|---|
| 0 | ADDRESS BOOK |
| 1 | RECEIVED MAIL |
| ⋮ | ⋮ |

STRUCTURE OF STORAGE AREA OF DATA MEMORY FOR DATA FILE

DATA STRUCTURE OF MEMORY

| REMOTE LOCK | ON |
|---|---|
| REMOTE DATA TRANSFER | ON |
| SPECIFIC TELEPHONE NUMBER | 03-AAAA-BBBB |
| RECEIVING-CALL GENERATION TIMES | 3 TIMES |
| RECEIVING-CALL GENERATION PERIOD RANGE | 10 MINUTES |

COMMUNICATION SYSTEM AND COMMUNICATION DEVICE

TECHNICAL FIELD

The present invention relates to a communication system and a communication device configured to restrain operations of a communication device such as a mobile telephone terminal.

This application is a national stage of international application No. PCT/JP2007/053606 filed Feb. 27, 2007, and claims the benefit of priority under 35 USC 119 of Japanese Patent Application No. 2006-050008, filed Feb. 27, 2006 and Japanese Patent Application No. 2007-016859, filed Jan. 26, 2007, the entire contents of all of which are incorporated herein by reference.

BACKGROUND ART

A mobile telephone terminal is more convenient than a fixed-line phone in that a user can freely carry the mobile telephone terminal. However, the mobile telephone terminal can easily be lost or stolen. For that reason, in the past, there was suggested a technique of a mobile telephone terminal having a lock function of forcibly locking operation of the mobile telephone terminal in a remote manner by e-mail in order to prevent a third party from illegitimately using the mobile telephone terminal which the user had lost or which had been stolen (see, for example, Patent Document 1).

In the technique disclosed in Patent Document 1, a lock code and a private code are registered in an e-mail to be sent, and a mobile telephone terminal receiving the e-mail analyzes the received e-mail. When the lock code or the private code accords with information set in advance, the operation of the mobile telephone terminal is configured to be forcibly locked.
Patent Document 1: Japanese Unexamined Patent Application, First Publication No. 2003-224886

DISCLOSURE OF INVENTION

Problems to Be Solved by the Invention

However, in the technology disclosed in Patent Document 1, the user has to memorize the lock code or the private code. Moreover, there occurs a problem in that the mobile telephone terminal may not receive the e-mail even when the e-mail having the lock code or the like is sent if the mobile telephone terminal is in a state in which communications therewith are unattainable, and the lock function described above cannot be operated.

Means for Solving the Problem

The invention was made to solve the above-described problems and an object thereof is to provide a communication system and a communication device capable of restraining operation of the communication device such as a mobile telephone terminal or preventing illegitimate use of data stored in the communication device even when the operations are permitted.

In order to solve the above-described problems, the invention provides a communication system including: a communication device; and a communication network configured to communicate with the communication device, wherein the communication network includes: a storage unit configured to store first communication information related to a communication to the communication device that is generated when communications with the communication device are unattainable; and a notifying unit configured to send the first communication information stored in the storage unit to the communication device when communications with the communication device become attainable and wherein the communication device is configured to receive the first communication information sent from the notifying unit, and comprises a restraining unit configured to restrain function of a local device based on the first communication information.

The invention further provides a communication system including: a communication device; and a communication network configured to communicate with the communication device, wherein the communication network comprises a restraining command unit configured to send restraining command information that restrains function of the communication device to the communication device when communication to the communication device is generated when communications with the communication device are unattainable, and the communication device is configured to receive the restraining command information sent from the restraining command unit, and comprises a restraining unit configured to restrain function of a local device based on the restraining command information that is received.

The invention still further provides a communication device including: a receiving unit configured to receive first communication information related to a communication to a local device that is generated when communications with a communication network are unattainable; and a restraining unit configured to restrain function of the local device based on the first communication information received by the receiving unit.

Effects of the Invention

According to the invention, when communications with a communication device are generated in the state in which the communications with the communication device connected to the communication network are unattainable, communication information is stored. In the state in which the communications with the communication device are attainable, the stored communication information related to the communication to the communication device is sent to the communication device, so that the function of the communication device is configured to be restrained based on the sent communication information. With such a configuration, the function of the communication device can be restrained with ease.

BRIEF DESCRIPTION OF THE DRAWINGS

FIG. 9 is a diagram illustrating the data structure of informative information to be set from the base station apparatus according to the first embodiment.

FIG. 12 is a diagram illustrating the structure of data set in a data memory of the mobile telephone terminal according to the second embodiment.

DESCRIPTION OF THE REFERENCE SYMBOLS

10: server apparatus
20: mobile telephone terminal
40: telephone
100: communication system

BEST MODE FOR CARRYING OUT THE INVENTION

Hereinafter, preferred embodiments of the invention will be described with reference to the drawings. The invention is not limited to the embodiments described below, but an appropriate combination of constituent elements in the embodiments is possible, for example.

First Embodiment

Figure 1:
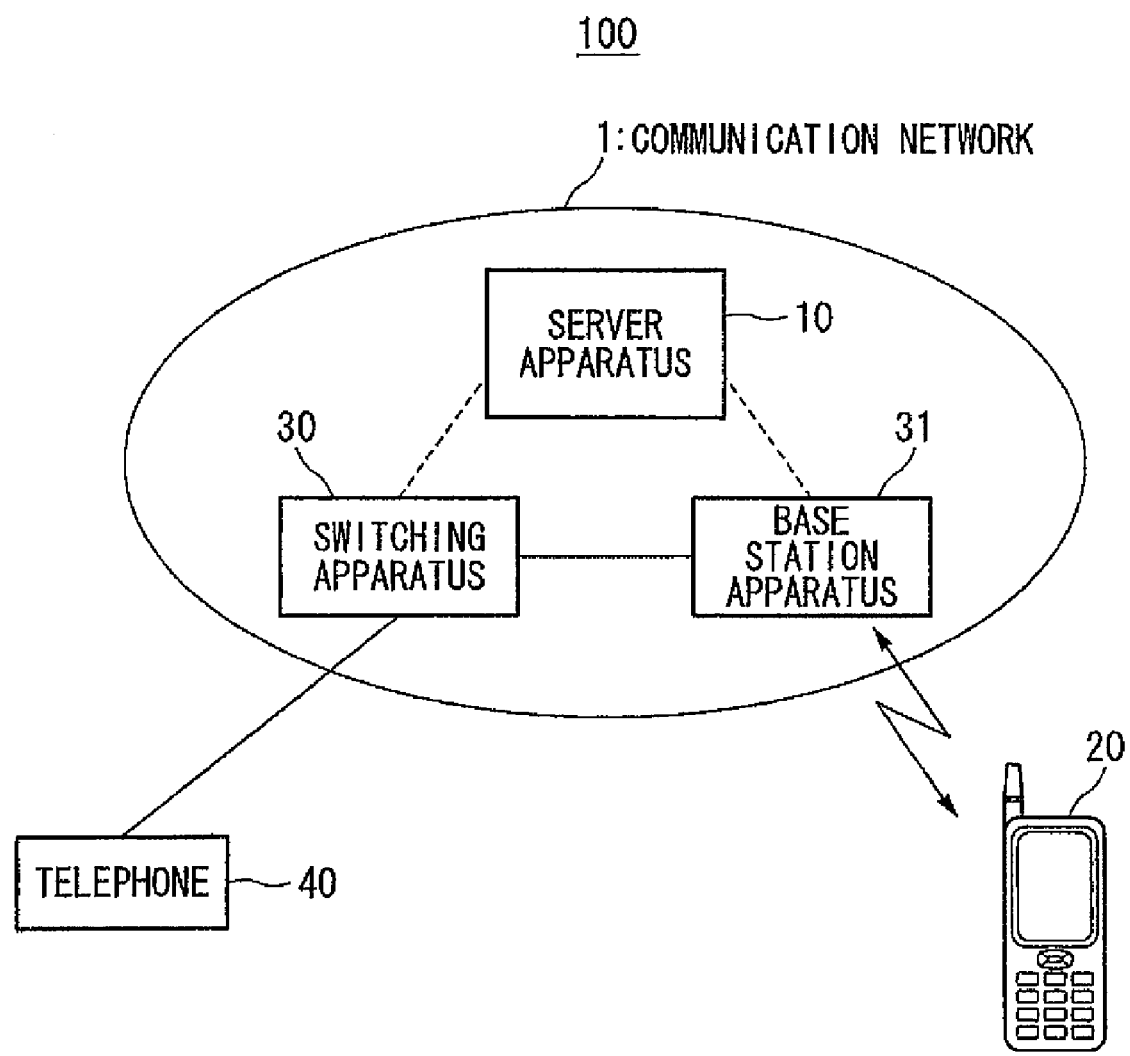
FIG. 1 is a block diagram illustrating a communication system according to a first embodiment.

FIG. 1 is a schematic block diagram illustrating a communication system 100 according to a first embodiment.

The communication system 100 includes a communication network 1, a telephone 40, and a mobile telephone terminal 20 (communication device). The communication network 1 includes switching equipment 30, a base station apparatus 31, and a server apparatus 10, and establishes or cuts off communications between the switching equipment 30 or the base station apparatus 31 and the telephone 40 or the mobile telephone terminal 20 to communicate with the mobile telephone terminal 20. The server apparatus 10 allows receiving-call information (first communication information) in an inner memory unit in a case in which the mobile telephone terminal 20 does not receive a call, that is, the mobile telephone terminal 20 is located out of communication range in which wireless communications with the base station apparatus 31 are unattainable, in a case in which the power supply to the mobile telephone terminal 20 is stopped, that is, the mobile telephone terminal 20 is turned off, or in a case in which a call is rejected by the operation of a person carrying the mobile telephone terminal 20 (hereinafter, such cases are referred to as communication unattainable state). The server apparatus 10 sends the receiving-call information to the cellular phone terminal 20 through an SMS (Short Message Service) in a case in which the cellular phone terminal 20 can receive a call, that is, in a case in which the communications are attainable.

The SMS refers to a push-type delivery service capable of sending and receiving a short text message between the mobile telephone terminals, In the first embodiment, the SMS is applied when the server apparatus 10 sends a plurality of receiving-call information to the mobile telephone terminal 20 in a case in which a plurality of receiving calls are generated in the mobile telephone terminal 20.

Next, the configuration of the mobile telephone terminal 20 will be described with reference to FIGS. 2 and 3.

In the mobile telephone terminal 20, a wireless transceiver 22 (receiving unit) includes an antenna 21 and wireless communications with the base station apparatus 31 are carried out through the antenna 21. The wireless communications are carried out by communication methods such as calls, SMS, and e-mail. A manipulation unit 25 corresponds to a keyboard or the like and detects manipulation by a user to execute various input operations or manipulation operations. A display unit 24 corresponds to a liquid crystal display screen or the like and displays information output from other functional units. A determination unit 23 determines whether or not to restrain various functions of the mobile telephone terminal 20 on the basis of information which the wireless transceiver 22 receives from the server apparatus 10. A lock unit 27 receives instruction information from the determination unit 23 and restrains the various functions of the mobile telephone terminal 20 when the determination unit 23 determines to restrain the various functions of the mobile telephone terminal 20. For example, a remote lock is carried out so that operations other than an operation of turning on or off power are not permitted, a function of carrying out wireless communication with the base station apparatus 31 through the antenna 21 is restrained, or a function of using data is restrained by deleting data of a memory 26 or banning use of the data.

The memory 26 corresponds to a non-volatile RAM (Random Access Memory) and stores information on predetermined conditions used to determined whether or not to restrain the various functions of the mobile telephone terminal 20 input from the manipulation unit 25. As shown in FIG. 3, the data configuration of the memory 26 includes items such as a remote lock, a specific telephone number, receiving-call generation times, and a receiving-call generation period range. In addition, predetermined conditions are formed by combining information stored in these items. A plurality of data constituted by the items such as the remote lock, the specific telephone number, the receiving-call generation times, and the receiving-call generation period range are stored in the memory 26.

Information stored in the item of the remote lock includes "ON" indicating that the lock unit 27 performs the remote lock of the mobile telephone terminal 20 and "OFF" indicating that the lock unit 27 does not perform the remote lock. Information stored in the item of the specific telephone number is information on a telephone number of the telephone 40 which is used to perform the remote lock. Information stored in the item of the receiving-call generation times (communication generation times) is information on the number of times of the receiving-call generation required at the time of performing the remote lock. Information stored in the receiving-call generation period range is information on a time value. The time value is a value indicating a time requirement for the number of times of the receiving call from the specific telephone number, which is required to perform the remote lock.

Figure 4:
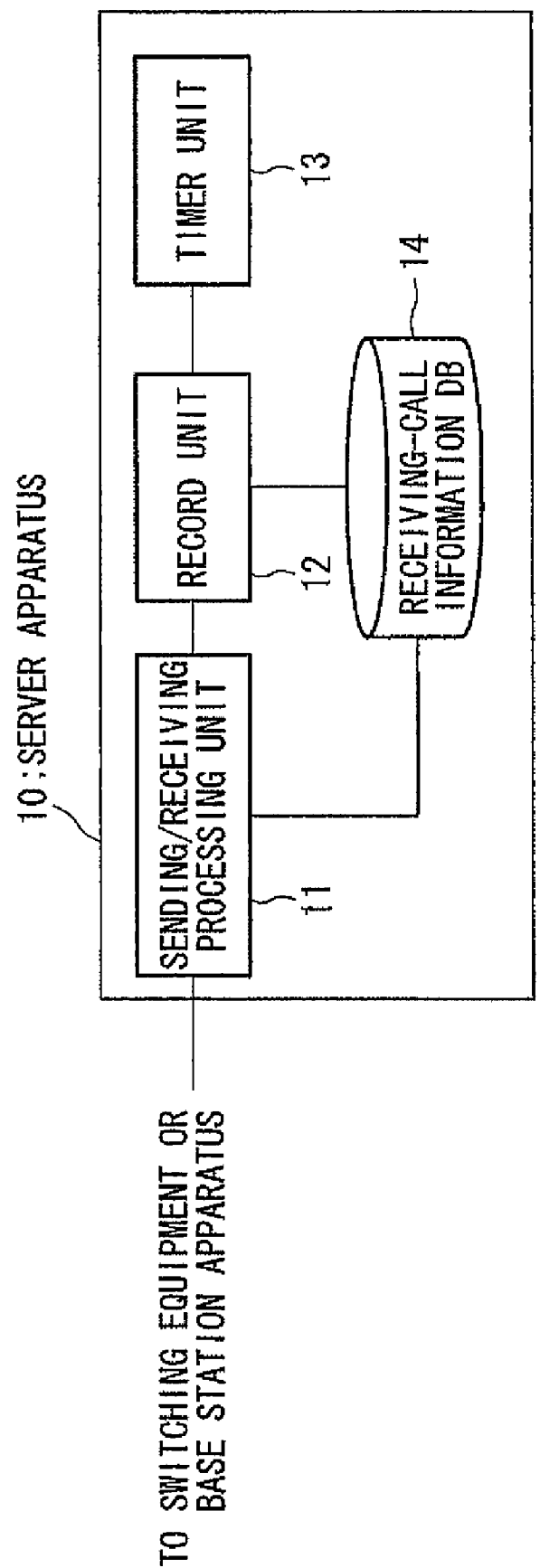
FIG. 4 is a block diagram illustrating the inner configuration of a base station apparatus according to the first embodiment.

Next, the configuration of the server apparatus 10 will be described with reference to FIGS. 4 and 5.

In the server apparatus 10, a sending/receiving processing unit 11 (notifying unit) is connected to the switching equipment 30 and the base station apparatus 31. The sending/receiving processing unit 11 is configured to request the base station apparatus 31 to send information on whether or not the mobile telephone terminal 20 is in an attainable communication state in order to receive the information. The sending/receiving processing unit 11 receives information on a receiving-call generated from the switching equipment 30 to the mobile telephone terminal 20, when a call is generated from the telephone 40 to the mobile telephone terminal 20 in a state in which the sending/receiving processing unit requests the base station apparatus 31 to send the information and receives information indicating that communications are unattainable. The generated call information includes information on the telephone number of the mobile telephone terminal 20 which is a call destination, and information on the telephone number of the telephone 40 which is a call source. The sending/receiving processing unit 11 sends information having a SMS format, described below, to the mobile telephone terminal 20 when the sending/receiving processing unit receives information indicating that communications with the mobile telephone terminal 20 are attainable from the base station apparatus 31 upon request.

When the sending/receiving processing unit 11 receives the information on the receiving-call generated from the switching equipment 30 to the mobile telephone terminal 20 in the state in which the communications are unattainable, a record unit 12 requests the time of day (hereinafter, generation time of day) of a timer unit 13 at the point of time to acquire the time of day. In addition, the record unit 12 records information, which is formed by associating the generated call information with the generation time of day acquired from the timer unit 13, as the generated call (communication) information in a receiving-call information DB Data Base) (storage unit) 14.

The sending/receiving processing unit 11 reads all receiving-call information from the receiving-call information DB 14 and sends the read information to the mobile telephone terminal 20 in the SMS format, when the sending/receiving processing unit receives from the base station apparatus 31 information indicating that the communication with the mobile telephone terminal 20 are attainable.

Figure 5:
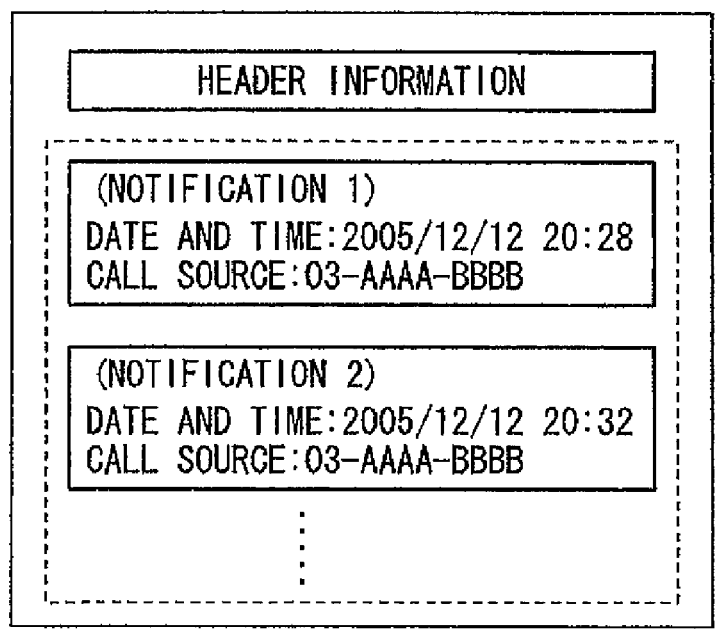
FIG. 5 is a diagram illustrating the data structure of SMS information to be sent from the base station apparatus according to the first embodiment.

FIG. 5 is a diagram illustrating the receiving-call information having the SMS format sent from the sending/receiving processing unit 11. As shown in FIG. 5, the information having the SMS format includes header information containing a type of SMS or the information on the telephone number of the mobile telephone terminal 20 of the call destination. In addition, the information having the SMS format includes the receiving-call information, which is illustrated as a part surrounded by a dashed-line in FIG. 5, subsequent to the header information. This receiving-call information contains a data item indicating the generation time of day and the information on the telephone number of the call source.

Figure 6:
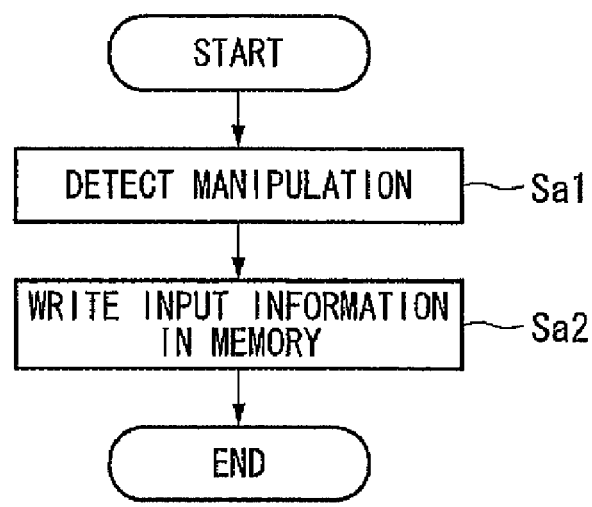
FIG. 6 is a diagram illustrating an information setting process in a memory of the mobile telephone according to the first embodiment.

FIG. 6 is a flowchart illustrating a process of setting the memory 26 in the mobile telephone terminal 20. First, when a user manipulates the manipulation unit 25, the manipulation unit 25 detects manipulated keys (Step Sa1). Then, corresponding respective information is input in the item of "the remote lock", the item of "the specific telephone", the item of "the receiving-call generation times", and the item of "the receiving-call generation period range" and the input respective information is written in the memory 26 (Step Sa2).

Figure 7:
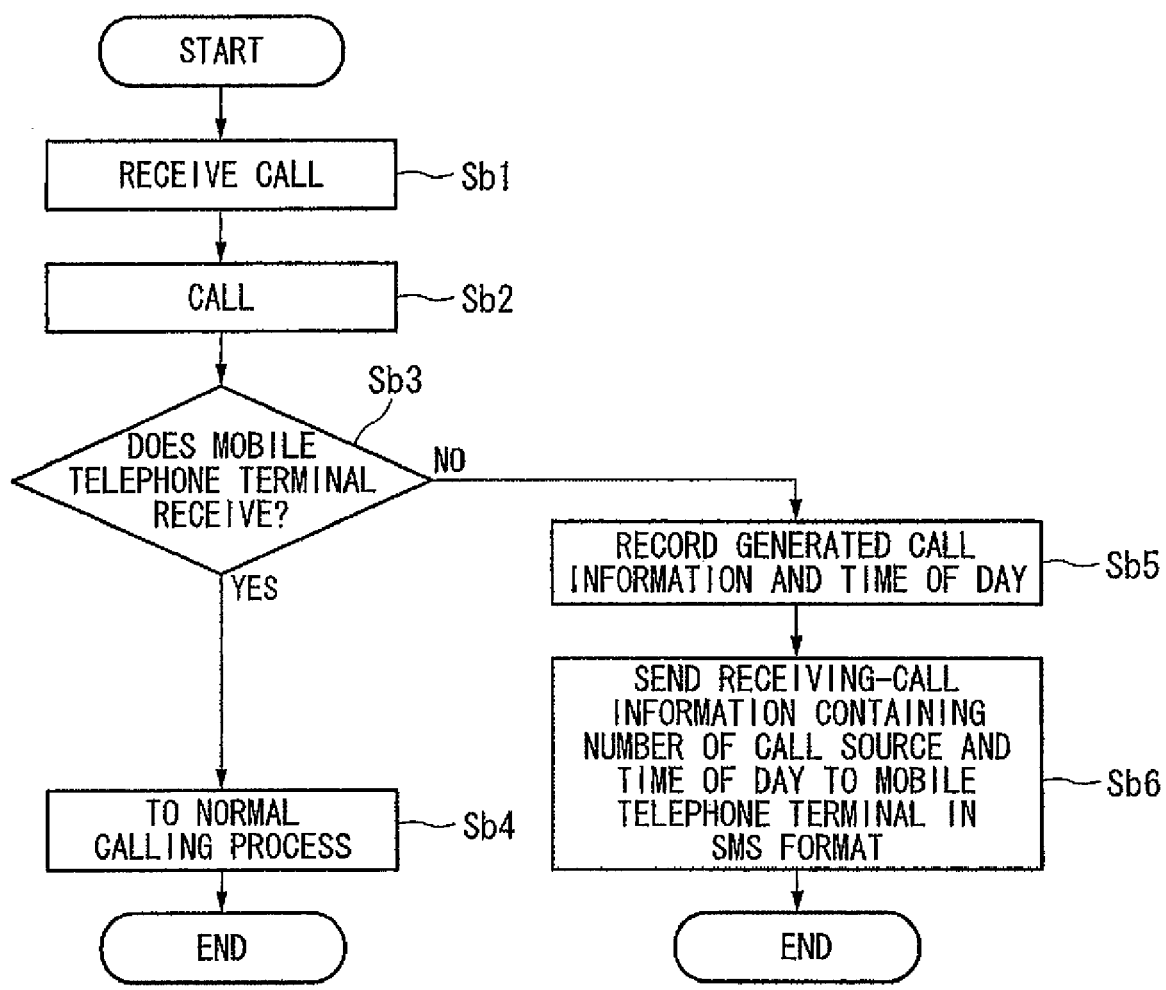
FIG. 7 is a flowchart illustrating processes in the base station apparatus according to the first embodiment.

Next, a process in the communication network 1 will be described with reference to FIG. 7. First, the switching equipment 30 detects a call request to the mobile telephone terminal 20 when a call is generated from the telephone 40 to the mobile telephone terminal 20 (Step Sb1). Subsequently, the switching equipment 30 initiates calling the mobile telephone terminal 20 through the base station apparatus 31 (Step Sb2). The switching equipment 30 determines whether or not the mobile telephone terminal 20 receives the call on the basis of information sent from the base station apparatus 31 (Step Sb3). When the mobile telephone terminal 20 receives the call, a communication between the telephone 40 and the mobile telephone terminal 20 is established to initiate the call (Step Sb4).

Alternatively, when the mobile telephone terminal 20 does not receive the call, that is, when the communications are unattainable, the switching equipment 30 sends the generated call information to the sever apparatus 10. The sending/receiving processing unit 11 of the server apparatus 10 inputs the received call information in the record unit 12, when the sending/receiving processing unit receives the generated call information from the switching equipment 30. The record unit 12 acquires from the timer unit 13 information on the time of day at which the communication is generated, and records information, which is made by associating information on the telephone numbers of the mobile telephone terminal 20 as the call destination and the telephone 40 as the call source contained in the generated call information with the generation time of day, in the receiving-call information DB 14 (Step Sb5).

Next, when the sending/receiving processing unit 11 receives, from the base station apparatus 31, the information indicating that the communications with mobile telephone terminal 20 are attainable using the SMS format, the sending/receiving processing unit 11 reads all the receiving-call information from the receiving-call information DB 14, and sends the read receiving-call information to the mobile telephone terminal 20 in the SMS format (Step Sb6).

Figure 8:
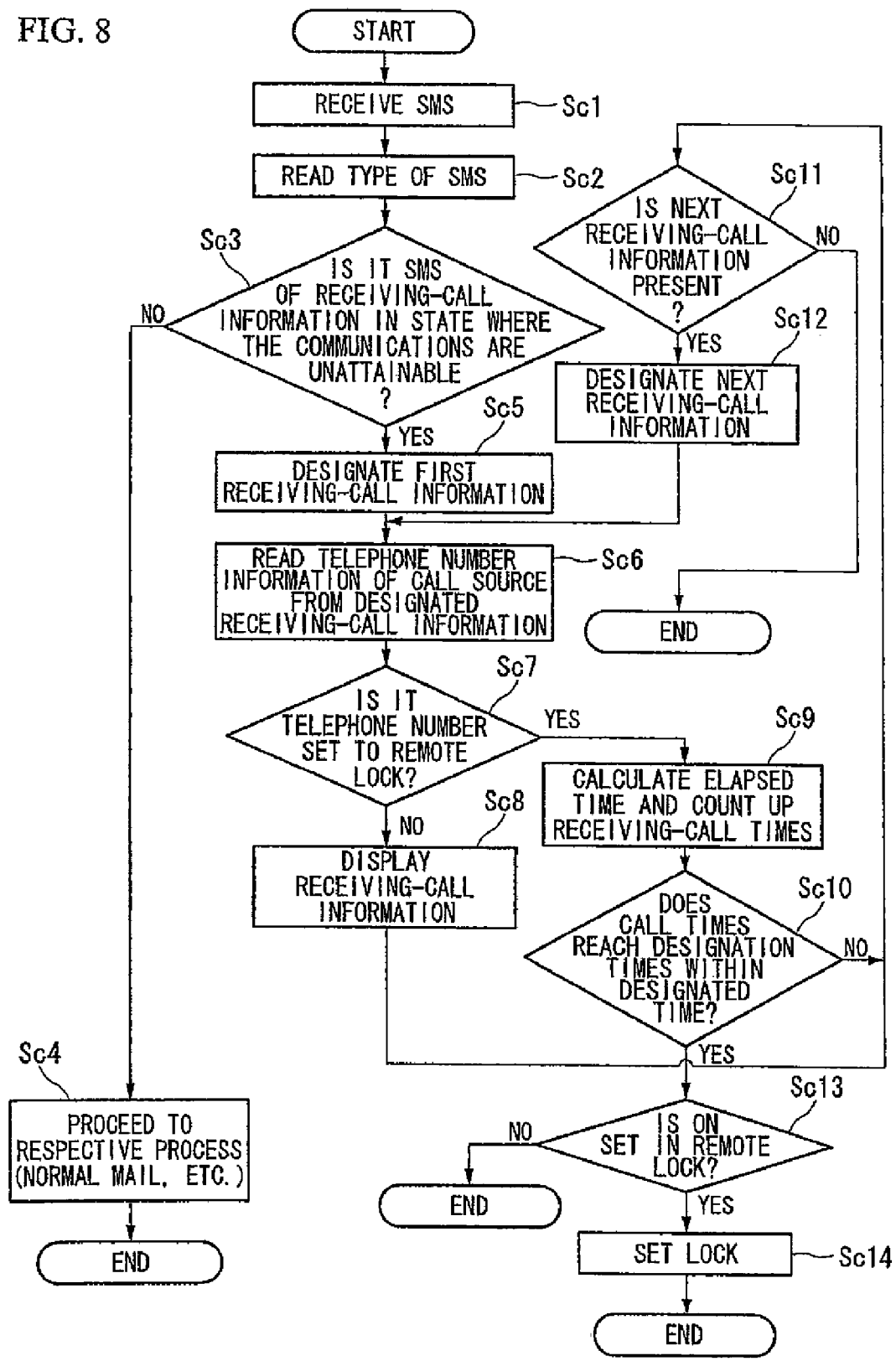
FIG. 8 is a flowchart illustrating processes of the mobile telephone terminal according to the first embodiment.

Next, a process of the mobile telephone terminal 20 will be described with reference to FIG. 8. The wireless transceiver 22 of the mobile telephone terminal 20 first receives the information having the SMS format from the server apparatus 10 through the base station apparatus 31 (Step Sc1). The wireless transceiver 22 reads the information on the type of the SMS contained in the header information of the SMS information shown in FIG. 5 (Step Sc2). Subsequently, the wireless transceiver 22 determines whether or not the read information on the type of the SMS is the SMS of the receiving-call information in the state in which the communications are unattainable (Step Sc3). When the information on the type of the SMS is not the receiving-call information in the state in which the communications are unattainable, for example, information on the e-mail or the like, a corresponding function is activated to perform a process corresponding to the function (Step Sc4).

Alternatively, when the information on the type of the SMS is the receiving-call information in a state in which the communications are unattainable, the wireless transceiver 22 reads the information on the type of the SMS from the received SMS information to input the read information, that is, the receiving-call information in the determination unit 23. The determination unit 23 designates the latest receiving-call information of the receiving-call information (Step Sc5) and reads information on the telephone number of the call source from the designated receiving-call information (Step Sc6). Subsequently, the determination unit 23 reads the telephone number information from the item of "the specific telephone number" of the memory 26, and determines whether or not the telephone number information accords with the telephone number of the call source read from the receiving-call information, that is, the telephone number designated for the remote lock (Step Sc7).

When the telephone number read from the information stored in the item of "the specific telephone number" of the memory 26 does not accord with the telephone number of the call source read from the receiving-call information, the determination unit 23 determines that the designated receiving-call information is not the receiving-call for the remote lock and displays the receiving-call information on the display unit 24 (Step Sc8). Subsequently, the determination unit 23 determines whether or not the next latest receiving-call information is present in the input receiving-call information (Step Sc11). When the next receiving-call information is not present, the process ends. Alternatively, when the next latest receiving-call information is present, the determination unit 23 designates the next latest receiving-call information (Step Sc12) and repeatedly performs the process subsequent to Step Sc6. For example, when the transmitted SMS information is the receiving-call information having the SMS format in FIG. 5, (Notification 2) is present as the next latest receiving-call information, and thus a head address or the like in which the information on (Notification 2) is present is designated.

Alternatively, when the telephone number read from the information stored in the item of "the specific telephone number" of the memory 26 does not accord with the telephone number of the call source read from the receiving-call information in Step Sc7, the determination unit 23 reads information on the time of day contained in the receiving-call information. Subsequently, when the call is the first call in the telephone numbers of the call sources from the analysis result of the read generation time of day, information on the read generation time of day is stored as an initial value of elapsed time in an inner storage area. When the call is not the first call, the difference between the elapsed time stored in the inner storage area and the read generation time of day is calculated as the new elapsed time, and then the calculated elapsed time is stored in the inner storage area. When the elapsed time is calculated, 1 is added to a receiving-call times counter stored in the inner storage area (Step Sc9). Subsequently, the determination unit 23 determines whether or not the call times reach a value corresponding to the receiving-call generation times within a generation period range on the basis of the calculated elapsed time, the value of the receiving-call times counter, the value of "the receiving-call generation times" of the memory 26, and the value of "the receiving-call generation period range" (Step Sc10).

When the determination unit 23 determines that the call times do not reach the value corresponding to the receiving-call generation times within the generation period range, the process in Step Sc11 described above, that is, the reading of the receiving-call information received at the next time, is additionally performed. Alternatively, when the determination unit determines that the call times reach the value corresponding to the receiving-call generation times within the generation period range, the determination unit 23 determines whether ON is set in "the remote lock" of the memory 26 (Step Sc13). When ON is set, the instruction information is input in the lock unit 27 and the mobile telephone terminal 20 is remotely locked (Step Sc14). Alternatively, when OFF is set in "the remote lock", the process ends.

With such a configuration of the above-described first embodiment, even if the mobile telephone terminal 20 is lost or stolen by an ill-intentioned person and the communications are unattainable since the mobile telephone terminal 20 is located out of communication range, the remote lock can be carried out when the communications with the mobile telephone terminal 20 become attainable by sending calls from the specific telephone 40 so as to reach the preset receiving-call generation times within the preset receiving-call generation period range.

The receiving-call information is sent actively, that is, in the form of the push type delivery using the SMS from the server apparatus 10, Accordingly, when the communications with the mobile telephone terminal 20 becomes attainable using the SMS, the mobile telephone terminal 20 cannot receive the receiving-call information, irrespective of the intention of a person carrying the mobile telephone terminal 20. Therefore, even if an ill-intentioned third party carries the mobile telephone terminal 20 and refuses to receive a call on purpose, the remote lock to the mobile telephone terminal 20 is possible in the state in which the communications are attainable by the SMS as long as the third party uses the mobile telephone terminal 20.

A plurality of the receiving-call information can be sent in the form of the SMS using just one SMS. Accordingly, even when the period for which communications are attainable is short, the remote lock to the mobile telephone terminal 20 can be carried out once one SMS is received.

In the first embodiment, the receiving-call information is sent in the form of the SMS format, but the invention is not limited to the SMS format. As shown in FIG. 9, the receiving-call information containing alarm information uniquely supplied by a mobile telephone communication service provider may be sent to the mobile telephone terminal 20.

Second Embodiment

Next, a second embodiment of the invention will be described with reference to FIGS. 10 to 13. The second embodiment has a configuration in which a data file is not permitted to be used by deleting the data file used by applications of the mobile telephone terminal 20a to restrain functions using the data file, even if the mobile telephone terminal 20a has been stolen by an ill-intentioned person.

Figures 10, 11:
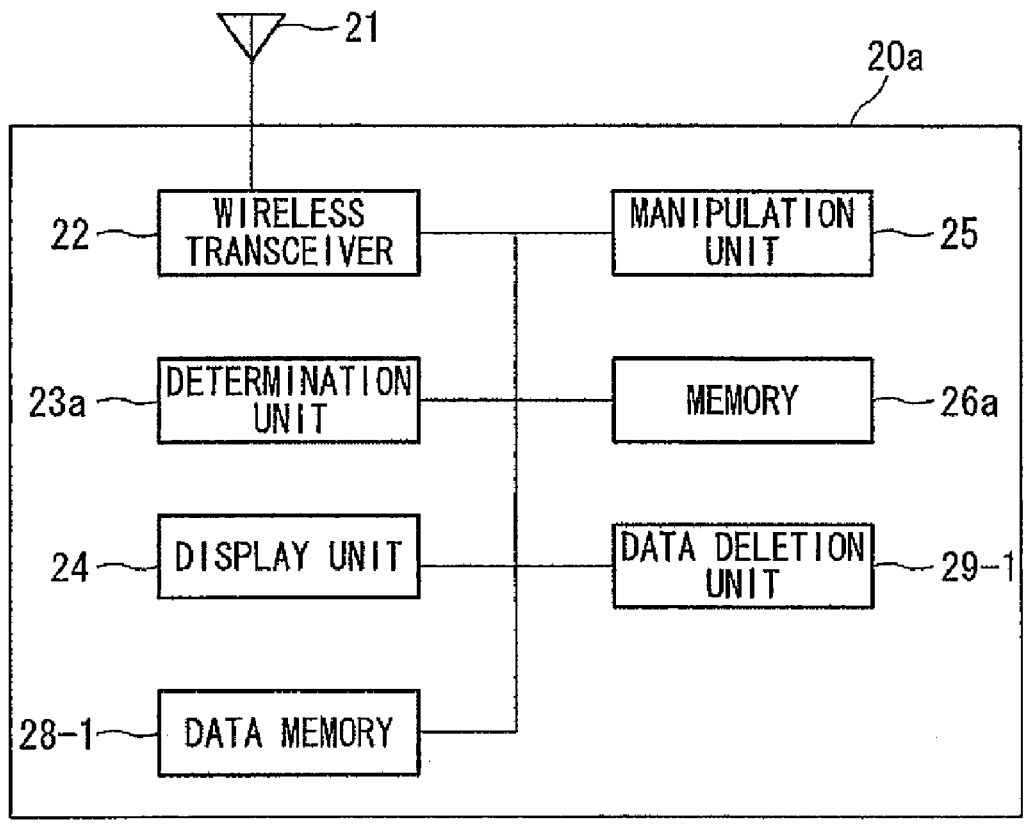
FIG. 10 is a block diagram illustrating the inner configuration of a mobile telephone terminal according to a second embodiment.
FIG. 11 is a diagram illustrating a data structure of a memory in the mobile telephone terminal according to the second embodiment.

FIG. 10 is a block diagram illustrating an inner configuration of the mobile telephone terminal 20a according to the second embodiment. In a communication system 100, the mobile telephone terminal 20a is used instead of the mobile telephone terminal 20 in the communication system shown in FIG. 1.

Figures 2, 3:
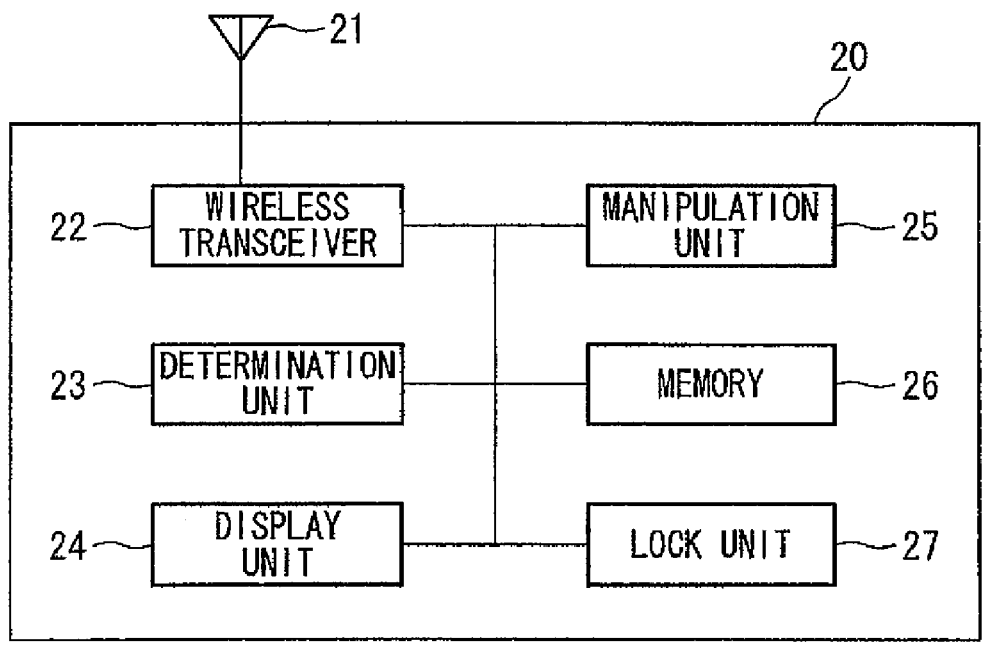
FIG. 2 is a block diagram illustrating the inner configuration of a mobile telephone terminal according to the first embodiment.
FIG. 3 is a diagram illustrating the data structure of a memory in the mobile telephone terminal according to the first embodiment.

In the mobile telephone terminal 20a shown in FIG. 10, a data deletion unit 29-1, a memory 26a, and determination unit 23a are disposed instead of the lock unit 27, the memory 26, and the determination unit 23, respectively, in the mobile telephone terminal 20 according to the first embodiment shown in FIG. 2. Other than the above, the configuration is the same as that of the mobile telephone 20, except that a data memory 28-1 storing the data file used for application programs is disposed. Hereinafter, a different configuration will be described. Note that, in addition to the configuration shown in FIG. 10, various application programs such as an address book using the data file stored in the data memory 28-1 are present.

In FIG. 10, the memory 26a has a data structure shown in FIG. 11 in which an item of a remote data deletion is used instead of the item of the remote lock among the data structure of the memory 26 in FIG. 3. Information stored in the item of "the remote data deletion" includes "ON" indicating that the data deletion unit 29-1 deletes the data file stored in the data memory 28-1 of the mobile telephone terminal 20a and "OFF" indicating that the data deletion unit does not delete the data file. Setting the memory 26a is performed like the process shown in FIG. 6 according to the first embodiment.

The data memory 28-1 has a storage area which stores setting data in which it is set whether to delete data files used for application programs and the data files used for the application programs. As shown in FIG. 12, the setting data includes items of "a deletion target flag" and "a data file name". Information stored in the item of "the deletion target flag" includes "1" indicating a deletion target to be deleted by the data deletion unit 29-1 and "0" indicating no deletion target. The setting can be altered by manipulation of a keyboard by a user. Information stored in the item of "the data file name" indicates file names of the application programs stored in the above-described storage area.

The determination unit 23a has a configuration for determining whether to delete the data file stored in the data memory 28-1 of the mobile telephone terminal 20a on the basis of the receiving-call information received from the server apparatus 10 by the wireless transceiver 22 and the information set in the memory 26a. Other than the above, the configuration is the same as the configuration of the determination unit 23. That is, the determination unit has the configuration for performing the determining of the type of the SMS or determining whether or not the receiving-call information is present, and the determining of the call times.

The data deletion unit 29-1 (restraining unit) receives the instruction information from the determination unit 23a, and deletes the data file, which is a deletion target in the setting data, with reference to the setting data of the data memory 28-1, when the determination unit 23a determines that the data file used for the application programs of the mobile telephone terminal 20a should be deleted. In this manner, the function of using the data file is restrained.

Figure 13:
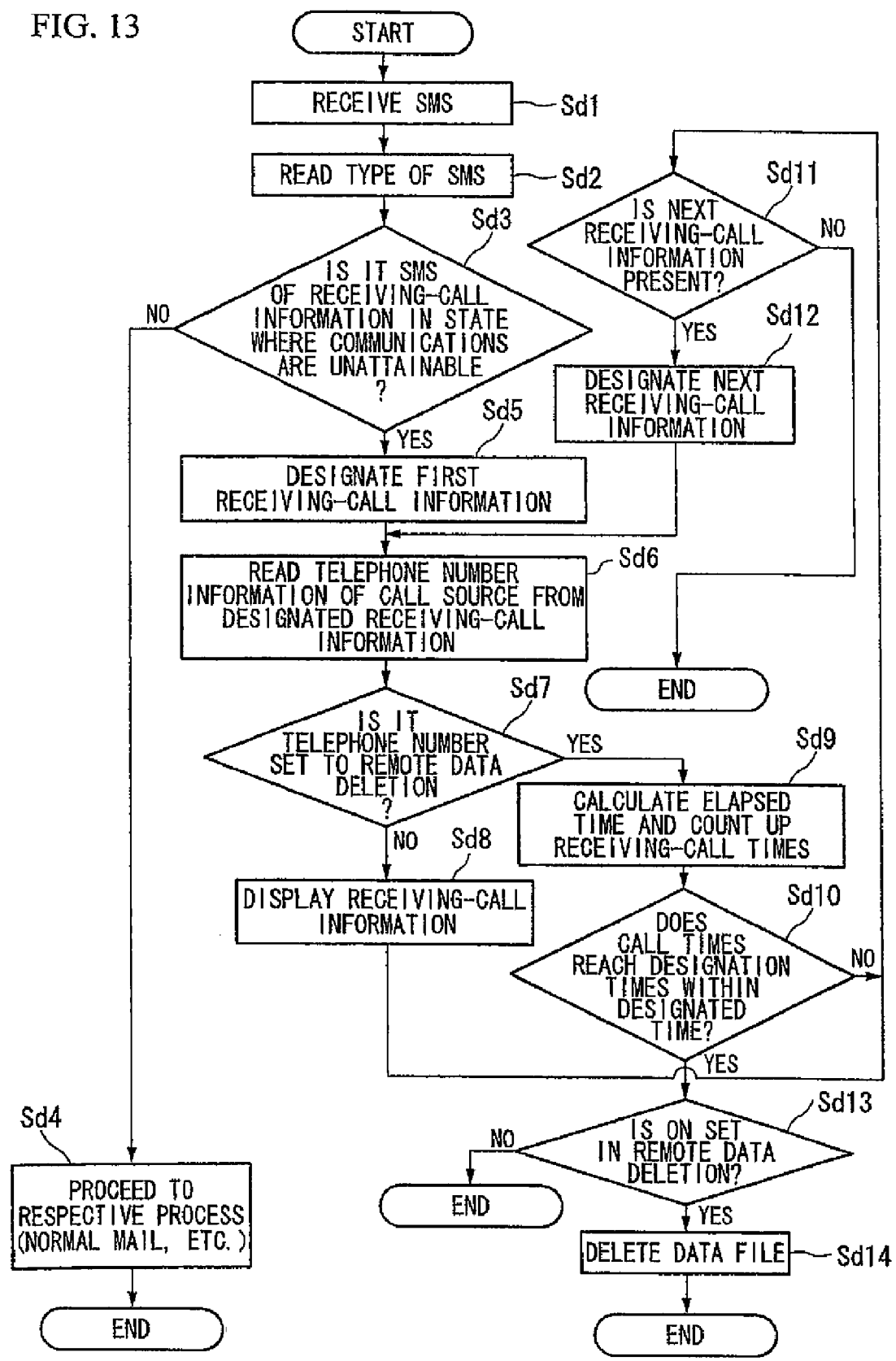
FIG. 13 is a flowchart illustrating processes of the mobile telephone terminal according to the second embodiment.

Next, a process of the mobile telephone terminal 20a according to the second embodiment will be described with reference to FIG. 13. The process performed from Step Sd1 to Step Sd10 is the same as the process performed from Step Sc1 to Step Sc10 in the first embodiment except that the determination unit 23a determines whether or not the telephone number of the call source read from the receiving-call information accords with the specific telephone number stored in the memory 26a in Step Sd7, that is, the telephone number designated for the remote data deletion. Hereinafter, a different process will be described.

In Step Sd10, the determination unit 23a determines whether the item of "the remote data deletion" of the memory 26a is ON, when the determination unit determines that the call times has reached a value corresponding to the receiving-call generation times within the receiving-call generation period range (Step Sd13). When the information stored in the item is ON, the instruction information is input to the data deletion unit 29-1. The data deletion unit 29-1 receiving the instruction information deletes the data file in which the deletion target flag is set in the setting data of the data memory 28-1 of the mobile telephone terminal 20a (Step Sd14). Alternatively) when the information stored in the item of "the remote data deletion" is OFF, the process ends.

According to the second embodiment, it is possible to delete the data file used for the application programs of the mobile telephone terminal 20a from the data memory 28-1 in the same sequence as the sequence for setting the remote lock according to the first embodiment. With such a configuration, even if the mobile telephone terminal 20a is stolen by an ill-intentioned person and the communications with the mobile telephone terminal 20a are unattainable since the mobile telephone terminal 20a is located out of communication range, the data file stored in the mobile telephone terminal 20a can be deleted when the communications with the mobile telephone terminal 20a become attainable by sending calls from the specific telephone 40 so as to reach the preset receiving-call generation times within the preset receiving-call generation period range. Accordingly, it is possible to prevent the data file from being used illegitimately.

Third Embodiment

Figure 16:
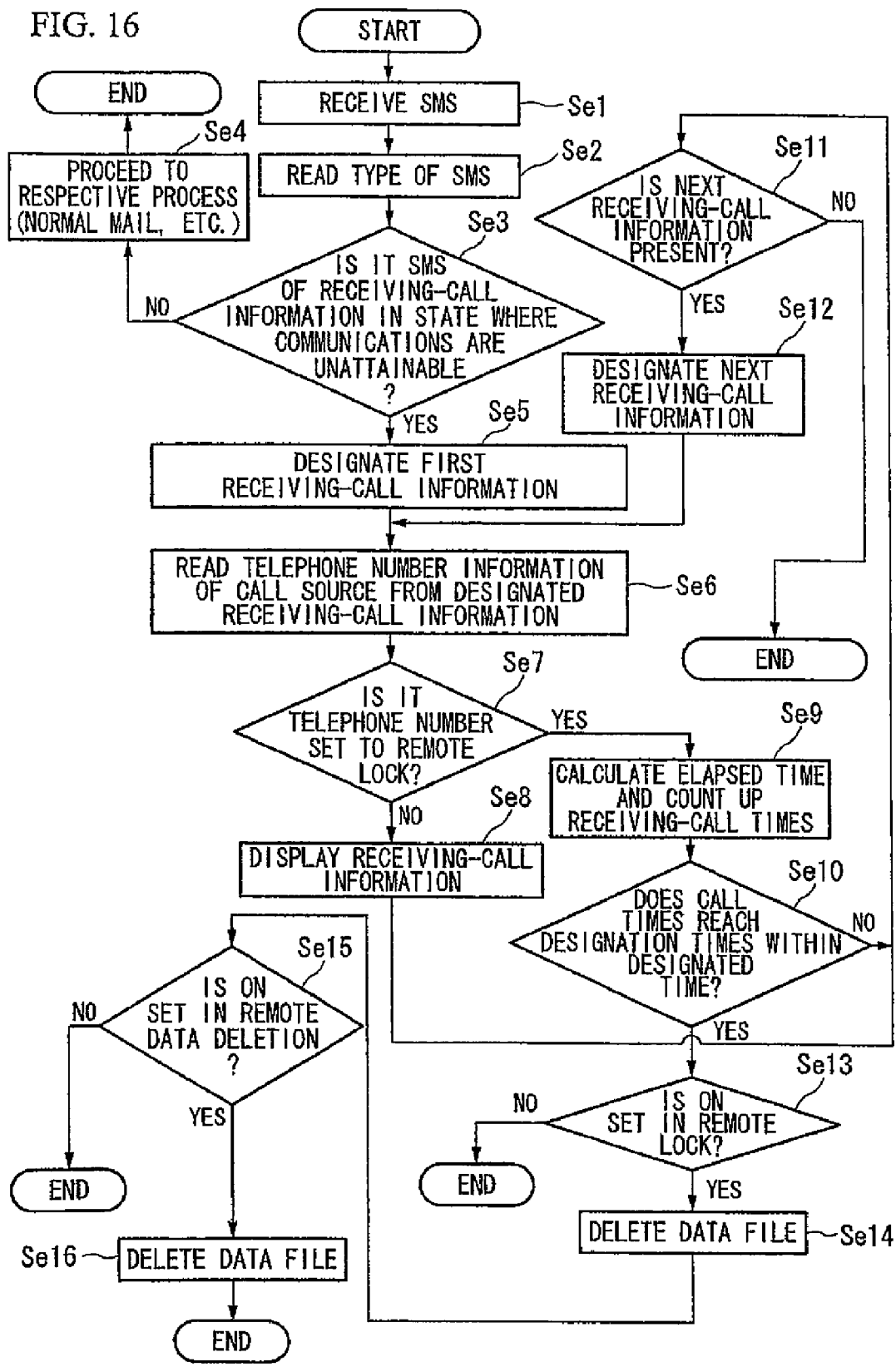
FIG. 16 is a flowchart illustrating processes of the mobile telephone terminal according to the third embodiment.

Next, a third embodiment of the invention will be described with reference to FIGS. 14 to 16. The third embodiment has a configuration in which the data file is deleted according to the second embodiment while setting the remote lock to the mobile telephone terminal according to the first embodiment.

Figures 14, 15:
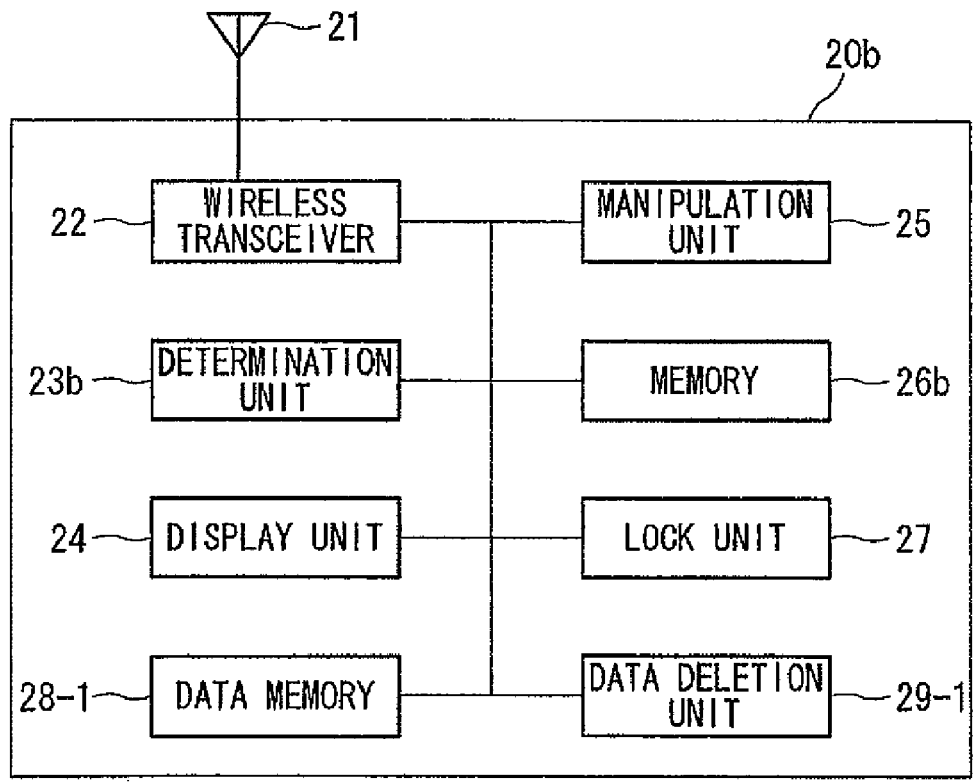
FIG. 14 is a block diagram illustrating the inner configuration of a mobile telephone terminal according to a third embodiment.
FIG. 15 is a diagram illustrating the data structure of a memory in the mobile telephone terminal according to the third embodiment.

FIG. 14 is a block diagram illustrating an inner configuration of a mobile telephone terminal 20b according to the third embodiment.

A communication system has the same configuration as the communication system 100 shown in FIG. 1, except that a mobile telephone terminal 20b is used instead of the mobile telephone terminal 20.

The mobile telephone terminal 20b shown in FIG. 14 has a configuration in which the data deletion unit 29-1 and the data memory 28-1 described in the second embodiment are disposed, a memory 26b is disposed instead of the memory 26, a determination unit 23b is disposed instead of the determination unit 23 in addition to the configuration of the mobile telephone terminal 20 shown in FIG. 2 according to the first embodiment. Other than the above, the configuration is the same as that of the mobile telephone terminal 20. Hereinafter, a configuration different from the functional units described in the first and second embodiments will be described. Like the second embodiment, in addition to the configuration shown in FIG. 14, various application programs such as an address book using the data file stored in the data memory 28-1 are present.

In FIG. 14, the memory 26b has a configuration in which the item of "the remote data deletion" described in the second embodiment is further included in addition to the data structure of the memory 26 shown in FIG. 3. The determination unit 23b has a configuration for determining whether or not to set the remote lock to the mobile telephone terminal 20b and determining whether or not to delete the data file stored in the data memory 28-1 described in the second embodiment on the basis of the receiving-call information received from the server apparatus 10 by the wireless transceiver 22 and the information set in the memory 26b. Other than the above, the configuration is the same as the configuration of the determination unit 23 described in the first embodiment. That is, the determination unit has the configuration for performing the determining of the type of the SMS, the determining of whether or not the receiving-call information is present, or the determining of the call times.

Next, the process of the mobile telephone terminal 20b according to the third embodiment will be described with reference to FIG. 16. The process performed from Step Se1 to Step Se14 is the same as the process performed from Step Sc1 to Step Sc14 in the mobile telephone terminal 20 according to the first embodiment. In Step Se14, the determination unit 23b inputs the instruction information to the lock unit 27 and the remote lock to the mobile telephone terminal 20b is carried out. Subsequently, the determination 23b determines whether or not information stored in the item of "the remote data deletion" of the memory 26b is ON (Step Se15). When the information stored in the item of "the remote data deletion" is determined to be ON, the determination unit 23b input the instruction information to the data deletion unit 29-1, and the data deletion unit 29-1 receiving the instruction information deletes the data file in which the deletion target flag is set in the setting data of the data memory 28-1 of the mobile telephone terminal 20b (Step Se16). Alternatively, when the information stored in the item of "the remote data deletion" is OFF, the process ends.

With such a configuration according to the third embodiment, it is possible to set the remote lock to the mobile telephone terminal 20b and delete the data file used for the application programs from the data memory 28-1. With such a configuration, even if the mobile telephone terminal 20b is stolen by an ill-intentioned person and the communications are unattainable since the mobile telephone terminal 20b is located out of communication range, the remote lock to the mobile telephone terminal 20b can be set when the communications with the mobile telephone terminal 20b become attainable by sending calls from the specific telephone 40 so as to reach the preset receiving-call generation times within the preset receiving-call generation period range. Additionally, even if the remote lock is released by a thorough attack on the password or by chance, the remote lock can again be set and the data file stored in the mobile telephone terminal 20b can be deleted. Accordingly, it is possible to prevent the data file from being used illegitimately.

In a configuration according to the third embodiment the data file is deleted only when the remote lock is set. However, the data file may be deleted by allowing the determination unit 23b to refer the information stored in the item of "the remote data deletion" of the memory 26b in a case where the information stored in the item is "ON", even when the remote lock is not set.

Fourth Embodiment

Next, a fourth embodiment of the invention will be described with reference to FIGS. 17 to 21. The fourth embodiment has a configuration for performing a process of transferring the data file to a storage area, to which predetermined access is limited, among the storage area of the data memory storing the data file to be deleted upon performing the deleting of the data file in the second embodiment, that is, the configuration for restraining functions using the data file by transferring the data file.

Figures 17, 18:
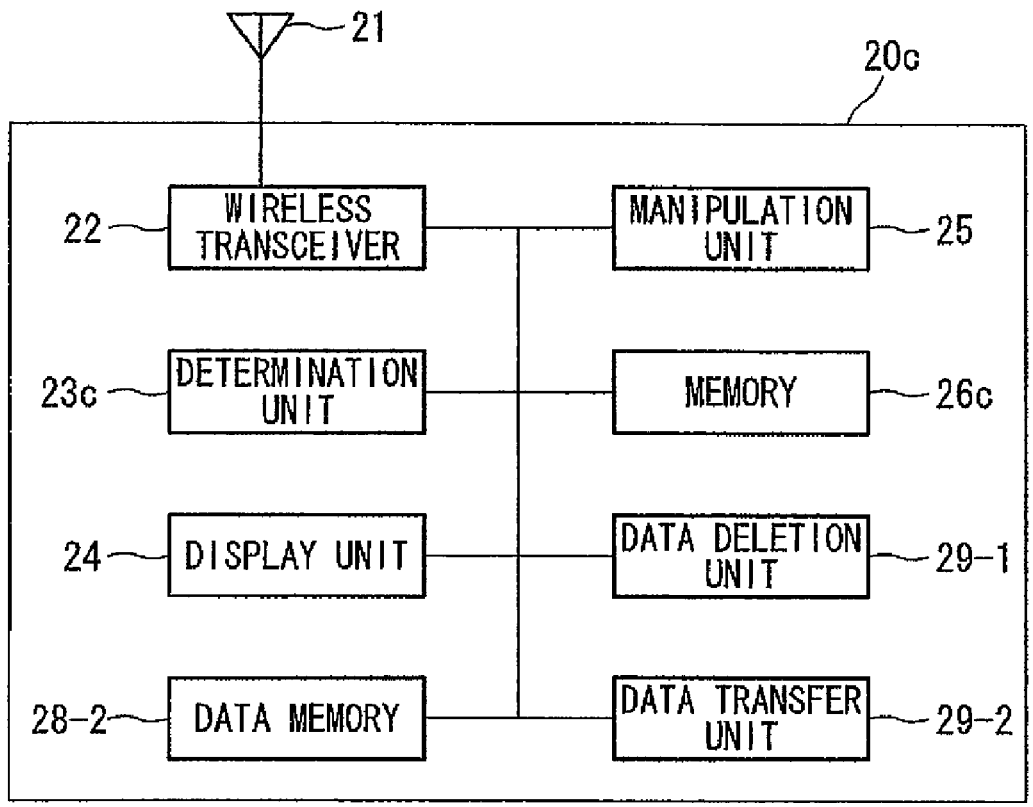
FIG. 17 is a block diagram illustrating the inner configuration of a mobile telephone terminal according to a fourth embodiment.
FIG. 18 is a diagram illustrating the data structure of a memory in the mobile telephone terminal according to the fourth embodiment.

FIG. 17 is a block diagram illustrating the inner configuration of a mobile telephone terminal 20c according to the fourth embodiment. A communication system has the same configuration as that of the communication system 100 shown in FIG. 1, except that the mobile telephone terminal 20c is used instead of the mobile telephone terminal 20.

The mobile telephone terminal 20c shown in FIG. 17 has a configuration in which a data transfer unit 29-2 (restraining unit) is disposed, a memory 26c is disposed instead of the memory 26a, a determination unit 23c is disposed instead of the determination unit 23a, and a data memory 28-2 is disposed instead of the data memory 28-1 in addition to the configuration of the mobile telephone terminal 20a shown in FIG. 10 according to the second embodiment. Other than the above, the e configuration is the same as that of the mobile telephone terminal 20a. Hereinafter, a different configuration will be described. In addition to the configuration shown in FIG. 17, various application programs such as an address book using the data file stored in the data memory 28-2 are present.

In FIG. 17, the memory 26c has a data structure shown in FIG. 18 in which an item of remote data transfer is used instead of the item of the remote data deletion in the data structure of the memory 26a in FIG. 11. Information stored in the item of "the remote data transfer" includes "ON" indicating that the data deletion unit 29-1 and the data transfer unit 29-2 transfer the data file stored in the data memory 28-2 of the mobile telephone terminal 20c to the storage area to which access is not permitted in the configuration for using the data file of the application programs in the data memory 28-2, and "OFF" indicating that the transferring process is not performed. Setting the memory 26c is performed in the same manner of the process shown in FIG. 6 according to the first embodiment.

Figures 19, 20:
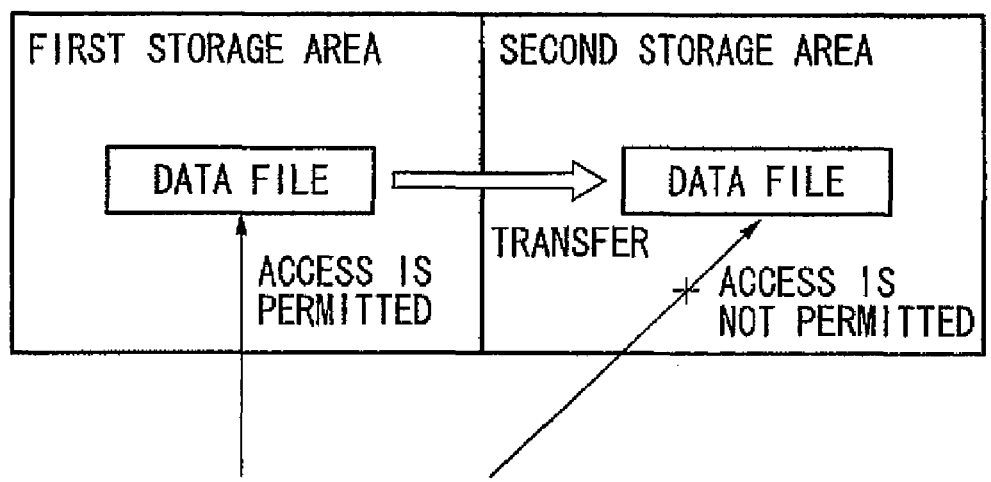
FIG. 19 is a diagram illustrating the structure of data set in a data memory of the mobile telephone terminal according to the fourth embodiment.
FIG. 20 is a diagram illustrating the configuration of a data file storage area of the data memory in the mobile telephone terminal according to the fourth embodiment.

The data memory 28-2 includes setting data in which it is set whether or not to transfer data files used for application programs and the data files used for the application programs. As shown in FIG. 19, the setting data includes items of "a transfer target flag" and "a data file name". Information stored in the item of "the transfer target flag" includes "1" indicating a transfer target to be deleted by the data deletion unit 29-1 and the data transfer unit 29-2 and "0" indicating no transfer target. The setting can be altered by manipulation of a keyboard of the mobile telephone terminal 20c by a user. Information stored in the item of "the data file name" indicates file names of the application programs stored in the above-described storage area. A structure of the storage area storing the data files shown in FIG. 20 includes a first storage area (first storage unit) to which access is permitted in the configuration for using the data files used for the application programs, that is, reading or deleting information such as the data files can be performed, and a second storage area (second storage unit) to which access is not permitted in this configuration unless an access method different from the access method of the first storage unit is used.

The data transfer unit 29-2 receives the instruction information from the determination unit 23c, transfers the data file set as the transfer target in the setting data from the first storage area to the second storage area with reference to the setting data of the data memory 28-2, inputs the instruction information containing information on the transferred data file in the data deletion unit 29-1, and allows the data deletion unit 29-1 (restraining unit) to delete the data file stored in the first storage area, when the determination unit 23c determines that the data file used for the application program of the mobile telephone terminal 20c should be transferred. In addition, at the time of the transfer, the data files may be read from the first storage area to be stored in a buffer. Then, all the data files stored in the buffer may be transferred to the second storage unit.

The determination unit 23c has a configuration for determining whether or not to transfer the data file stored in the data memory 28-2 of the mobile telephone terminal 20c on the basis of the receiving-call information received from the server apparatus 10 by the wireless transceiver 22 and the information set in the memory 26c. Other than the above, the configuration is the same as that of the determination unit 23a.

Figure 21:
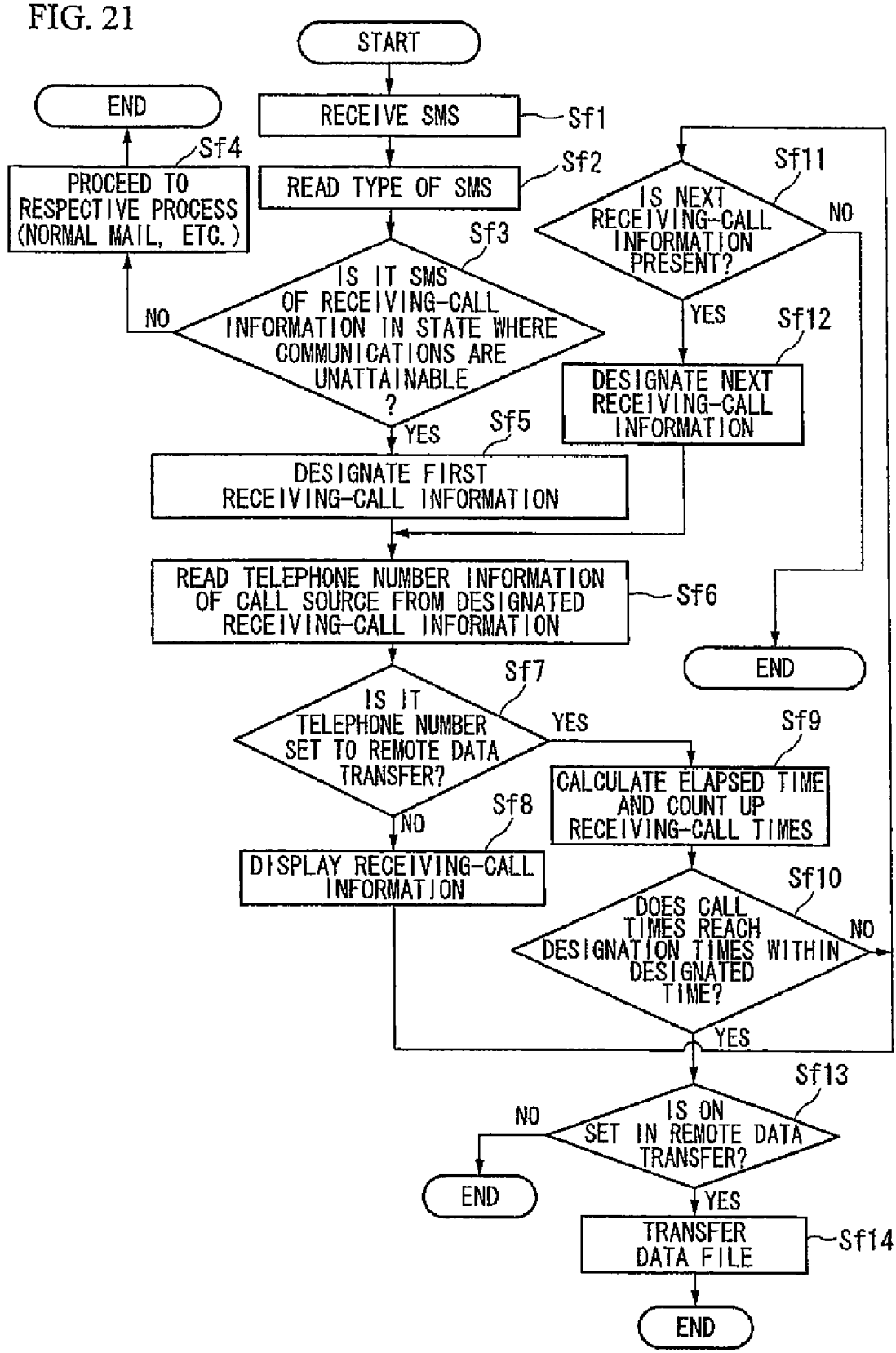
FIG. 21 is a flowchart illustrating processes of the mobile telephone terminal according to the fourth embodiment.

Next, a process of the mobile telephone terminal 20c according to the fourth embodiment will be described with reference to FIG. 21. The process performed from Step Sf1 to Step Sf10 is the same as the process performed from Step Sd1 to Step Sd10 according to the second embodiment, except that the determination unit 23c determines whether or not the telephone number of the call source read from the receiving-call information accords with the specific telephone number stored in the memory 26c in Step Sf7, that is, the telephone number designated for the remote data transfer, Hereinafter, a different process will be described.

When the determination unit 23c determines that the call times reach a value corresponding to the receiving-call generation times with the receiving-call generation period range in Step Sf10, the determination unit 23c determines whether or not the information stored in the item of "the remote data transfer" of the memory 26c is set to "ON" (Step Sf13). When the information stored in the item of "the remote data transfer" is set to "ON", the instruction information is input to the data transfer unit 29-2. The data transfer unit 29-2 receiving the instruction information transfers the data file in which the transfer target flag is set in the setting data of the data memory 28-2 of the mobile telephone terminal 20c from the first storage area to the second storage area. The data transfer unit 29-2 inputs the instruction information containing the information on the data file in the data deletion unit 29-1 and allows the data deletion unit 29-1 to delete the data file from the first storage area. That is, the transferring of the data file from the first storage area to the second storage area is performed by the data deletion unit 29-1 and the data transfer unit 29-2 (Step Sf14). Alternatively, when the information stored in the item of "the remote data transfer" is set to OFF, the process ends.

With such a configuration according to the fourth embodiment, it is possible to transfer the data file used for the application program of the mobile telephone terminal 20c from the first storage area to the second storage area of the data memory 28-2 in the same sequence as the sequence in which the data file is deleted in the second embodiment. With such a configuration, even if the mobile telephone terminal 20c is stolen by an ill-intentioned person and the communications are unattainable since the mobile telephone terminal 20c is located out of communication range, the data file stored in the mobile telephone terminal 20c can be transferred to the second storage area to be deleted from the first storage area when the communications with the mobile telephone terminal 20c become attainable by sending calls from the specific telephone 40 so as to reach the preset receiving-call generation times within the preset receiving-call generation period range. In the fourth embodiment, the data file can again stored in the first storage area by the owner to use the mobile telephone terminal 20c restored to the pre-stolen state, when the mobile telephone terminal 20c is returned to the owner.

Fifth Embodiment

Figure 24:
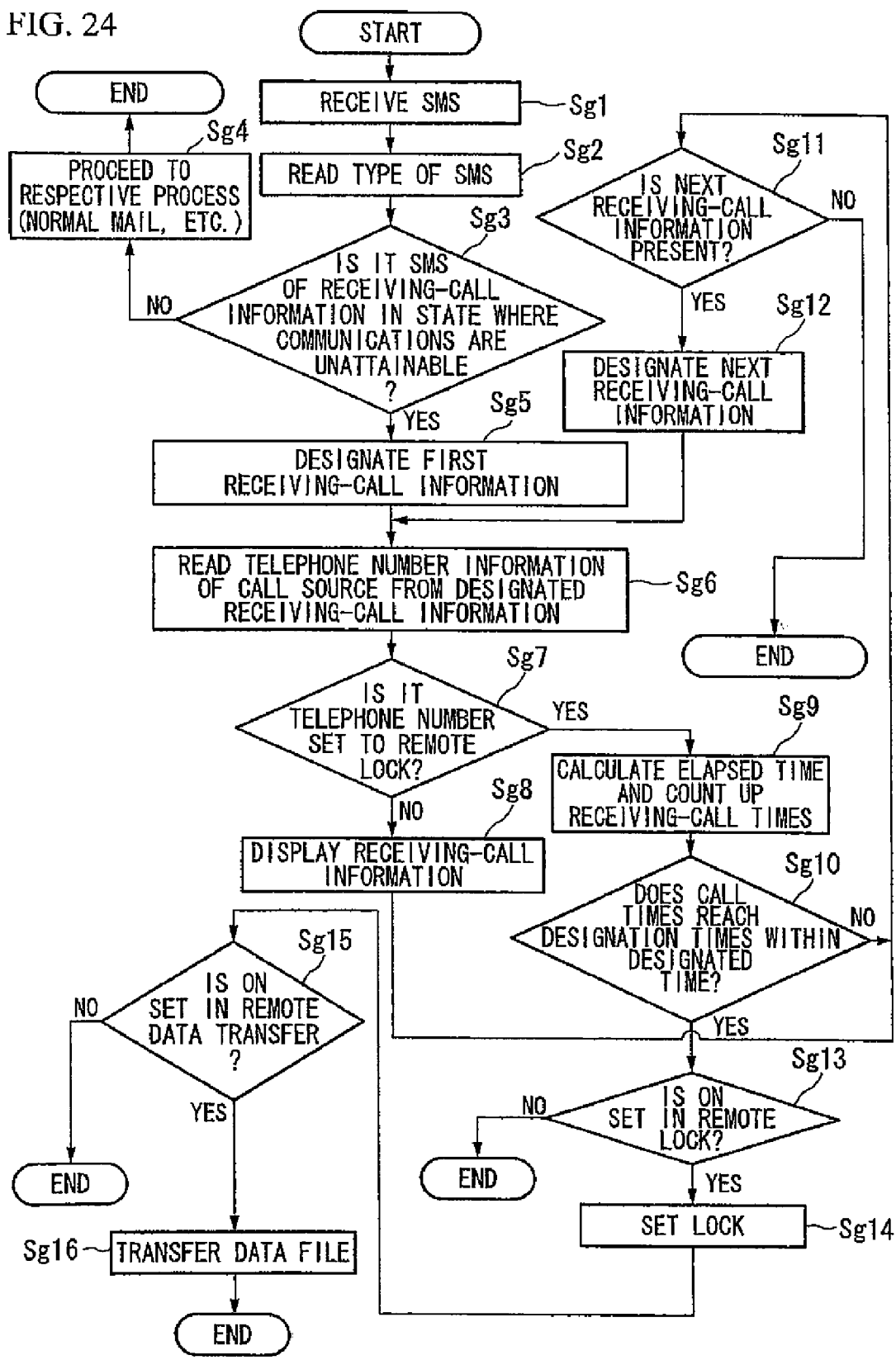
FIG. 24 is a flowchart illustrating processes of the mobile telephone terminal according to the fifth embodiment.

Next, a fifth embodiment of the invention will be described with reference to FIG. 22 to FIG. 24. The fifth embodiment has a configuration for performing the transferring of the data file described in the fourth embodiment in addition to the setting of the remote lock to the mobile telephone terminal described in the first embodiment.

Figures 22, 23:
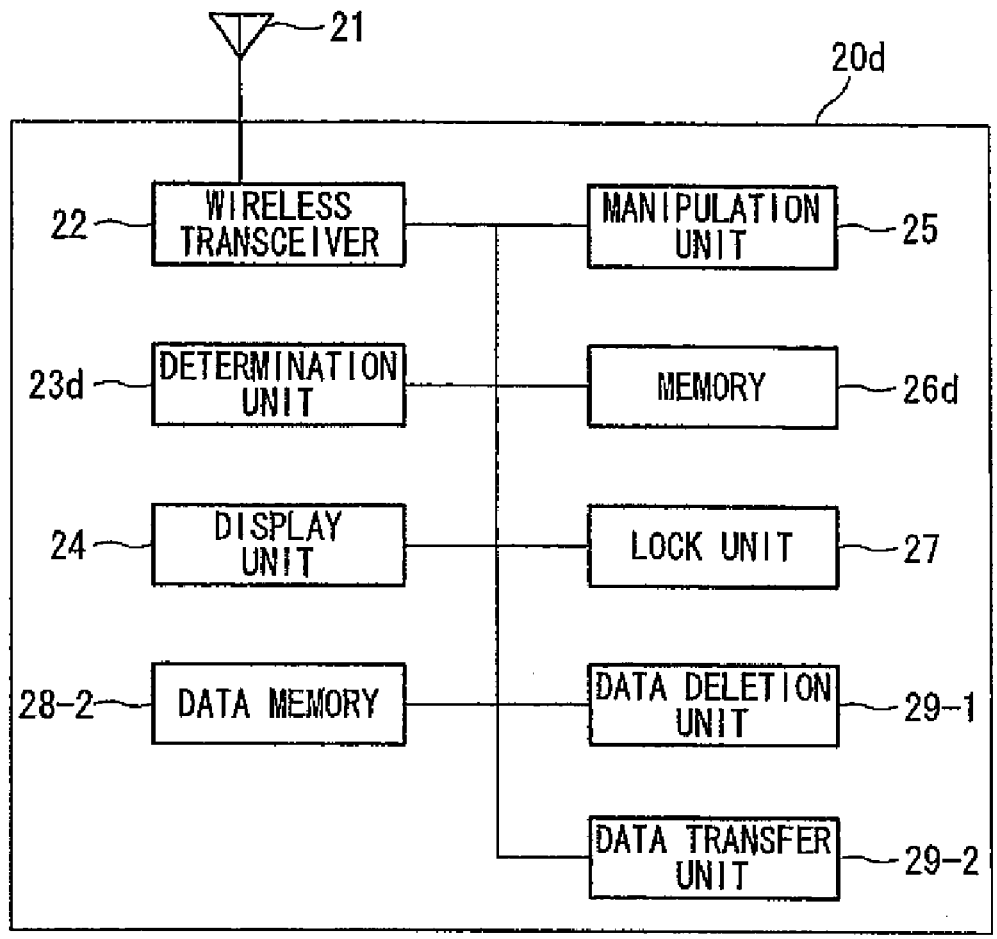
FIG. 22 is a block diagram illustrating the inner configuration of a mobile telephone terminal according to a fifth embodiment.
FIG. 23 is a diagram illustrating the data structure of a memory in the mobile telephone terminal according to the fifth embodiment.

FIG. 22 is a block diagram illustrating the inner configuration of a mobile telephone terminal 20d according to the fifth embodiment.

A communication system has the same configuration as that of the communication system 100 shown in FIG. 1, except that the mobile telephone terminal 20d is used instead of the mobile telephone terminal 20.

The mobile telephone terminal 20d shown in FIG. 22 has a configuration in which the data deletion unit 29-1, the data transfer unit 29-2, the data memory 28-2 described in the fourth embodiment are disposed, a memory 26d is disposed instead of the memory 26, and a determination unit 23d is disposed instead of the determination unit 23 in addition to the configuration of the mobile telephone terminal 20 in FIG. 2 according to the first embodiment. Other than the above, the configuration is the same as that of the mobile telephone terminal 20. Hereinafter, a configuration different from the functional units described in the first and fourth embodiments will be described. Like the fourth embodiment, in addition to the configuration shown in FIG. 22, various application programs such as an address book using the data file stored in the data memory 28-2 are present.

In FIG. 22, the memory 26d farther includes the item of "the remote data transfer" described in the fourth embodiment in addition to the data structure of the memory 26 in FIG. 3. The determination unit 23d has a configuration for determining whether or not to set the remote lock to the mobile telephone terminal 20d and determining whether or not to transfer the data file stored in the data memory 28-2 described in the fourth embodiment, on the basis of the receiving-call information received from the server apparatus 10 by the wireless transceiver 22 and the information set in the memory 26d. Other than the above, the configuration is the same as the configuration of the determination unit 23 described in the first embodiment. That is, the determination unit has the configuration for performing the determination of the type of the SMS, the determination of whether or not the receiving-call information is present, or the determination of the call times.

Next, the process of the mobile telephone terminal 20d according to the fifth embodiment will be described with reference to FIG. 24. The process performed from Step Sg1 to Step Sg14 is the same as the process performed from Step Se1 to Step Sc14 in the mobile telephone terminal 20 according to the first embodiment. In Step Sg14, the determination unit 23d inputs the instruction information to the lock unit 27 and the remote lock to the mobile telephone terminal 20d is carried out. Subsequently, the determination unit 23d determines whether or not information stored in the item of "the remote data transfer" of the memory 26d is ON (Step Sg15). When the information stored in the item of "the remote data transfer" is determined to be "ON", the instruction information is input to the data transfer unit 29-2, and the data transfer unit 29-2 receiving the instruction information transfer the data file in which the transfer target flag is set in the setting data of the data memory 28-2 of the mobile telephone terminal 20d from the first storage area to the second storage area. The data transfer unit 29-2 inputs the instruction information containing the information on the data file in the data deletion unit 29-1 and allows the data deletion unit 29-1 to delete the data file from the first storage area. That is, the transferring of the data file from the first storage area to the second storage area can be performed by the data deletion unit 29-1 and the data transfer unit 29-2 (Step Sg16). Alternatively, when the information stored in the item of "the remote data transfer" is OFF, the process ends.

With such a configuration according to the fifth embodiment, it is possible to set the remote lock to the mobile telephone terminal 20*d* and transfer the data file used for the application programs from the first storage area to the second storage area of the data memory 28-2. With such a configuration, even though the mobile telephone terminal 20*d* is stolen by an ill-intentioned person and the communications are unattainable since the mobile telephone terminal 20*d* is located out of a communication range, the remote lock to the mobile telephone terminal 20*d* can be set by sending a call as many as the preset receiving-call generation times within the receiving-call generation period range preset from the specific telephone 40 in the state in which the communications are again attainable. Additionally, even though the remote lock is released by a brute force of a password or by chance, the remote lock to the mobile telephone terminal 20*d* can be set and the data file stored in the mobile telephone terminal 20*d* can be transferred to the second storage area. Accordingly, it is possible to prevent the data file from being used illegitimately. In the fifth embodiment, the data file can again stored in the first storage area by the owner to use the mobile telephone terminal 20*d* restored to the stolen previous state, when the mobile telephone terminal 20*d* is returned to the owner.

In the configuration according to the fifth embodiment, the data file is transferred only when the remote lock is set. However, the data file may be deleted by allowing the determination unit 23*d* to refer the information stored in the item of "the remote data deletion" of the memory 26*d* in a case where the information stored in the item is "ON", even when the remote lock is not set.

Reading Unit of Transferred Data File

Here, in order to read and restore an encoded data file stored in the second storage area described in the fourth and fifth embodiments while keeping security for the encoded data file, conditions described below must be taken into consideration. Note that, in the following description, a mobile telephone terminal corresponds to the mobile telephone terminal 20*c* described in the fourth embodiment and mobile telephone terminal 20*d* described in the fifth embodiment.

(1) It is preferable that restoring the encoded data file stored in the second storage area to the first storage area not be possible by using the application programs provided in the mobile telephone terminal.

(2) It is preferable that the data file stored in the second storage area be read while satisfying the condition represented by (1). For example, the condition represented by (2) can be achieved by configuring the data file stored in the second storage area to be read only by a personal computer connected to the mobile telephone terminal.

(3) It is preferable that the data file read by a personal computer or the like be configured so as to be restored in the first storage area of the mobile telephone terminal.

(4) It is preferable that, when decoding the encoded data file and restoring the decoded data file to the mobile telephone terminal are performed, a manipulation person perform the restoring, that is, the decoding and re-storing on the basis of the intention of the legitimate owner. In this case, the legitimate owner refers to an owner who is registered to a contracted mobile telephone communication service provider.

(5) It is preferable that the data file read by a personal computer or the like not be written in mobile telephone terminals other than the original mobile telephone terminal.

The condition represented by (1) is a condition required to be satisfied since the data file may be restored by a third part who has stolen the mobile telephone terminal if the data file can be restored by the application program of the mobile telephone terminal and the restoration configuration is already known. The condition represented by (1) can be achieved by providing a configuration in which access to the second storage area is permitted through a data management unit included in the mobile telephone terminal and the data management unit identifies an application program of an access source to reject access when the identified application program is a predetermined application program which is not permitted to be accessed among the application programs of the mobile telephone terminal, for example.

The condition represented by (2) can be achieved by setting the personal computer connected to the mobile telephone terminal, as described above, as a readable device, but it is necessary to provide a configuration for keeping security. For example, a configuration for encoding the data file when the data file is read by a personal computer or the like or a configuration capable of reading the data file by a personal computer executed by a specific person may be taken into consideration for keeping the security. However, if the data file stored in the first storage area is stored in the second storage area, there is a possibility of the data file being electrically read from the second storage area. In order to prevent such a problem, the data file can be encoded to be transferred to the second storage area when the data transfer unit 29-2 transfers the data file from the first storage area to the second storage area in order not to use the data file read by a personal computer or the like as it is. In this manner, high security can be maintained t by the above-described configuration. In addition, even when the configuration for restoring the data file to the first storage area under the condition represented by (3) is known to a third party, high security can be maintained by encoding the data file upon transferring the data file from the first storage area to the second storage area because the encoded data file cannot be used as long as the data file is encoded.

The condition represented by (4) can be achieved in such a manner that a communication service provider provides the personal computer or the like used to read the data file from the mobile telephone terminal in a service center and it is determined that the mobile telephone terminal belongs to the legitimate owner registered in advance by authenticating the legitimate owner on the basis of biological information such as the fingerprint, the iris, the glottis, the face, the vein, other defects, DNA, or retina, for example. Even though a degree of the security becomes lower, the password or the like registered in advance may be used to perform personal authentication instead of the biological information.

The condition represented by (5) can be achieved by employing a configuration in which an identification number assigned in advance to the mobile telephone terminal is assigned to the data file when the data file is transferred from the first storage area to the second storage area to determine whether or not the identification number assigned to the written data file accords with the identification number assigned to the mobile telephone terminal to be re-stored when the data file is restored.

With the conditions satisfied, it is possible to prevent restoring since the restoring is rejected by personal authentication, even if a third party tries to restore the data file using the personal computer or the like provided by the communication service provider. Moreover, it is possible to prevent illegitimate use since the data file re-stored in the first storage area cannot be used owing to the encoded data file, even if a third party can electrically read the data file from the second storage area in the mobile telephone terminal in person.

The data file used for the respective application program in the fourth and fifth embodiments include an address book data file, a history data file, a reception data file for an e-mail, a transmission data file for an e-mail, a creation data file created by manipulation of a user in the mobile telephone terminal, a download data file downloaded through a network, and a bookmark data file recording a network address or the like.

Data contained in the address book data file is data made by associating a name, a telephone number, an e-mail address, an address, GPS (Global Positioning System) information, and the like with each other. Data contained in the history data file is sending-call history data, receiving-call history data, Web access history data, etc. Data contained in the reception data file is received mail data and the like received through an e-mail program and data contained in the transmission data file is sent mail data or draft data of an e-mail. Data contained in the creation data file is picture or video data photographed by a camera mounted in the mobile telephone terminal, recorded voice data, processed picture or video data, processed voice data, weather data, memo data, schedule data, data for setting alarm, etc. Data contained in the download data file is data of still image, video, or voice, data of an application program, etc. Data contained in the bookmark data file is URL (Universal Resource Locator) data, positioning data, etc.

The memories 26a, 26b, 26c, and 26d described in the second embodiment to the fifth embodiment may be memories storing a plurality of data constituted by the items of the respective memories 26a, 26b, 26c, and 26d described above.

In the first to fifth embodiments, the remote lock, the remote data deletion, and the remote data transfer are performed on the mobile telephone terminals 20, 20a, 20b, 20c, and 20d only by the call from the telephone 40. Accordingly, the remote lock, the remote data deletion, and the remote data transfer are easily performed without a sequence for setting special information used to permit the remote lock or the like to the e-mail, which was performed in the past.

In the first to fifth embodiments, not only the receiving-call information sent in the SMS format in the state in which the communications are unattainable but also the receiving-call information (second communication information) in the state in which the communications are attainable may be stored in a storage area of the respective mobile telephone terminals 20, 20a, 20b, 20c, and 20d or the storage unit 12 of the server apparatus 10. In this case, the remote lock, the remote data deletion, and the remote data transfer may be performed when the receiving-call generation times in the state in which the communications are attainable and the receiving-call generation times in the state in which the communications are unattainable are in total the receiving-call generation time within the receiving-call generation period range set in advance. With such a configuration, the remote lock, the remote data deletion, the remote date transfer can be performed on the mobile telephone terminals 20, 20a, 20b, 20c, and 20d by continuing to generate the communications to the mobile telephone terminals 20, 20a, 20b, 20c, and 20d up to predetermined times, even when the communication becomes unattainable while performing remote lock, remote data deletion, and remote data transfer in the state in which the communications with the mobile telephone terminals 20, 20a, 20b, 20c, and 20d are attainable.

In the first to fifth embodiments, remote lock, remote data deletion, and remote data transfer are performed on the mobile telephone terminals 20, 20a, 20b, 20c, and 20d on the basis of the telephone call. However, remote lock, remote data deletion, and remote data transfer are performed on the mobile telephone terminals 20, 20a, 20b, 20c, and 20d on the basis of the reception information of the e-mail, that is, on the basis of transmission times or the like of the e-mail.

In the first to fifth embodiments, a predetermined condition under which remote lock, remote data deletion, and remote data transfer are performed on the mobile telephone terminals 20, 20a, 20b, 20c, and 20d is that the communications are generated as many as the preset times between the preset receiving-call generation period range. However, the invention is not limited to the above condition, For example, remote lock, remote data deletion, and remote data transfer are performed when the receiving-call generation interval is a value equal to or less than a predetermined period.

In the first to fifth embodiments, remote lock, remote data deletion, and remote data transfer are performed on the mobile telephone terminals 20, 20a, 20b, 20c, and 20d on the basis of only the receiving call of the specific telephone number registered in advance. However, the invention is not limited to the above embodiments. For example, remote lock, remote data deletion, and remote data transfer may be performed on the mobile telephone terminals 20, 20a, 20b, 20c, and 20d on the basis of an arbitrary telephone number of a call source or on the basis of satisfying only a predetermined condition by storing a plurality of specific telephone numbers in the memories 26, 26a, 26b, 26c, and 26d, respectively. In this case, the receiving-call generation period range or the receiving-call generation times may be configured to be different in every telephone number.

In the first to fifth embodiments, it is determined whether or not the receiving-call satisfies the predetermined condition in the mobile telephone terminals 20, 20a, 20b, 20c, and 20d. However, the invention is not limited to the above embodiments. The server apparatus 10 may perform the determination on the basis of the above-described predetermined condition when information is stored in the receiving-call information DB 14, and then an operation restraining command (restraining command information) for activating the lock unit 27 and a data deleting command (restraining command information) for activating the data deletion unit 29-1 and the data transfer unit 29-2 may be created to send the operation restraining command the data deleting command to the mobile telephone terminal 20. In this case, on the basis of the operation restraining command and the data deleting command sent from the server apparatus 10, the remote lock, the remote data deletion, and the remote data transfer may be performed on the mobile telephone terminals 20, 20a, 20b, 20c and 20d.

In the second to fifth embodiments, the SMS information is configured to be sent when the receiving-call information is sent, However, like the first embodiment, as shown in FIG. 9, alarm information set by the mobile telephone communication service provider in its own way may be sent to the mobile telephone terminals 20a, 20b, 20c, and 20d.

The invention may be put into practice as a communication method in the communication network 1 configured to communicate with a communication device (the mobile telephone terminal 20). In the communication method, the first communication information related to a communication to the communication device that is generated in the state in which communications with the communication device are unattainable is stored in the communication network 1. In the state in which the communication with the communication device becomes attainable, the stored first communication information is sent from the communication network 1 to the communication device. Then, when the communication device receives the sent first communication information, function of a local device may be restrained on the basis of the received first communication information.

When the invention is put into practice as the communication method in the communication network 1 configured to communicate with the communication device (the mobile telephone terminal 20), the restraining command information for restraining the function of the communication device is sent from the communication network 1 to the communication device when the communication with the communication device is unattainable. Then, when the communication device receives the sent restraining command, the function of the local device may be restrained on the basis of the received restraining command information.

The invention may be put into practice as the server apparatus 10 which stores information related to the communication with the communication device (the mobile telephone terminal 20) when the communication network 1 configured to communicate with the communication device. The server apparatus 10 may include a storage unit 14 configured to store first communication information which is related to the communication to the communication device that is generated in the state in which the communication with the communication device is unattainable and restrains the function of the local device when the communication device receives the communication information; and a notifying unit (the sending/receiving processing unit 11) configured to send the first communication information stored in the memory unit to the communication device in the state in which communication with the communication device is unattainable.

When the invention is put into practice as the server apparatus 10, the server apparatus 10 may include a restraining command unit configured to send the restraining command information which restrains function of the communication device to the communication device when communication to the communication device is generated in the state in which communication with the communication device is unattainable.

INDUSTRIAL APPLICABILITY

The invention is applicable to a communication system and a communication device which restrain operations of the communication device such as a mobile telephone terminal.

The invention claimed is:
1. A communication system comprising:
a communication device; and
a communication network configured to communicate with the communication device,
wherein the communication network comprises:
a storage unit configured to store first communication information related to a communication to the communication device that is generated when communications with the communication device are unattainable; and
a notifying unit configured to send the first communication information stored in the storage unit to the communication device when communications with the communication device become attainable, and
wherein the communication device is configured to receive the first communication information sent from the notifying unit, and comprises a restraining unit configured to restrain function of a local device based on the first communication information.

2. The communication system according to claim 1,
wherein the first communication information includes information of times of day at which the communications to the communication device are generated, and
wherein the restraining unit is configured to restrain the function of the local device when it is determined, based on the times of day at which the communications are generated and which are included in the first communication information, that the communications to the communication device are generated predetermined times within a predetermined period.

3. The communication system according to claim 1, wherein the restraining unit is configured to restrain the function of the local device based on second communication information related to a communication to the communication device that is generated when the communication device is able to communicate with the communication network, and on the first communication information sent from the notifying unit of the communication network.

4. The communication system according to claim 3,
wherein the first communication information and the second communication information respectively include information of times of day at which the communications to the communication device are generated, and
wherein the restraining unit is configured to restrain the function of the local device when it is determined, based on the information of the times of day at which the communications are generated and which is included in the first communication information and the second communication information, that the communications to the communication device are generated predetermined times in total within a predetermined period.

5. The communication system according to claim 1, wherein the notifying unit configured to send information of the communication to the communication device using a push-type distribution.

6. The communication system according to claim 1, wherein the communication device comprises a first storage unit configured to store data, and the restraining unit is configured to restrain function of using the data stored in the first storage unit based on the first communication information sent from the notifying unit.

7. The communication system according to claim 6, wherein the restraining unit is configured to restrain the function of using the data by deleting the data stored in the first storage unit based on the first communication information.

8. The communication system according to claim 7, wherein the communication device comprises a second storage unit to which access is limited, and the restraining unit is configured to transfer the data stored in the first storage unit based on the first communication information from the first storage unit to the second storage unit.

9. A communication device comprising:
a receiving unit configured to receive first communication information related to a communication to a local device that is generated when communications with a communication network are unattainable; and
a restraining unit configured to restrain function of the local device based on the first communication information received by the receiving unit.

10. The communication device according to claim 9, wherein the first communication information includes information of times of day at which the communications to the local device are generated, and the restraining unit is configured to restrain the function of the local device when it is determined, based on the times of day at which the communications are generated and which are included in the first communication information, that the communications to the local communication device are generated predetermined times within a predetermined period.

11. The communication device according to claim 9, wherein the restraining unit is configured to restrain the function of the local device based on second communication information related to a communication to the local device that is generated when communications with the communication network are attainable, and on the first communication information.

12. The communication device according to claim 11, wherein the first communication information and the second communication information respectively include information of times of day at which the communications to the local device are generated, and the restraining unit is configured to restrain the function of the local device when it is determined, based on the information of the times of day at which the communications are generated and which is included in the first communication information and the second communication information, that the communications to the local device are generated predetermined times in total within a predetermined period.

13. A communication system comprising:
a communication device; and
a communication network configured to communicate with the communication device,
wherein the communication network comprises:
a storage unit configured to store first communication information relate to a communication to the communication device, the first communication information being generated when the communication network cannot communicate with the communication device; and
a notifying unit configured to send the first communication information stored in the storage unit when the communication network can communicate with the communication device, and
wherein the communication device is configured to receive the first communication information sent from the notifying unit, and comprises a restraining unit configured to restrain function of the communication device based on the first communication information.

14. A communication device comprising;
a receiving unit configured to receive first communication information related to a communication to the communication device, the first communication information being generated when a communication network cannot communicate with the communication device; and
a restraining unit configured to restrain function of the communication device based on the first communication information received by the receiving unit.

* * * * *